INVENTORS
Jervis B. Webb and
Herbert A. Stevenson
BY
ATTORNEY.

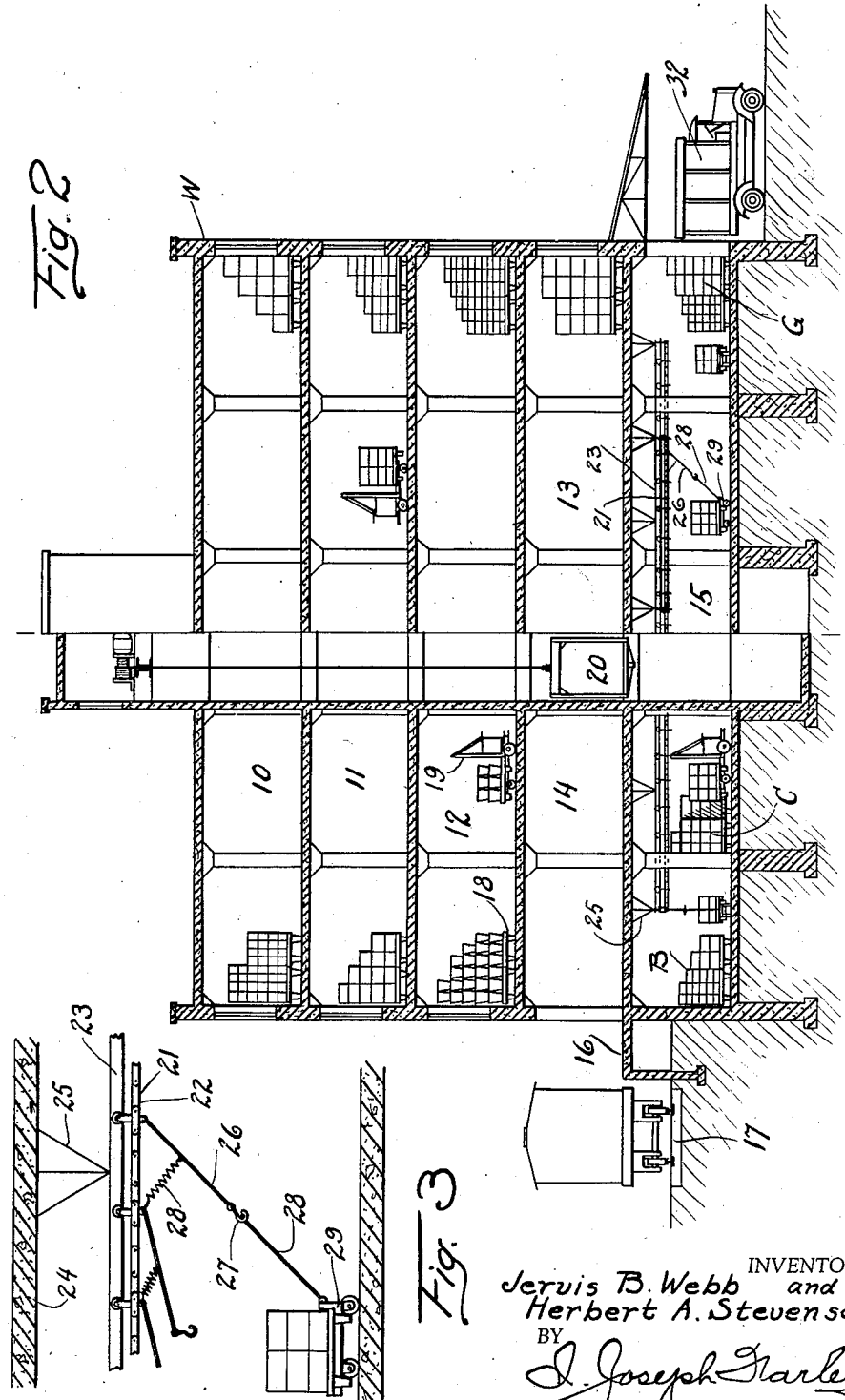

Patented Jan. 23, 1934

1,944,771

UNITED STATES PATENT OFFICE 1,944,771

METHOD FOR THE HANDLING OF MATERIAL

Jervis B. Webb, Royal Oak, and Herbert A. Stevenson, St. Clair Shores, Mich.

Application July 27, 1931. Serial No. 553,322

1 Claim. (Cl. 214—152)

This invention relates to methods for the handling of material and particularly to the handling of goods in warehouses where relatively large quantities of many different brands and kinds of merchandise are stored to be collected and put up on orders which ordinarily include relatively small quantities of a large number of diverse articles from the main stock.

The principal object of the invention is to provide a new and improved construction and arrangement for a warehouse in which the main stocks of goods are grouped and classified in relatively large quantities on storage floors or areas in such a manner as to be readily accessible for transportation to and from such floors, in conjunction with a selector floor or area wherein smaller quantities of goods are stored and classified in an orderly arrangement contiguous to a continuously moving conveyor.

The present invention also has for its object to provide a goods receiving floor or area preferably arranged in juxtaposition to a railroad siding, motor truck driveway or other transportation facility, coupled with a receiving platform upon which large shipments of goods may be readily deposited and also a shiping platform in juxtaposition to the selector floor area, but segregated from the receiving platform and floor or area.

Another object of the invention is to provide a method particularly adapted for the handling of goods by the use of the well known skid and lift trucks so that such goods may be handled with the minimum of effort and lost motion.

The above and other objects of the invention will appear more fully from the following more detailed description and by reference to the accompanying drawings forming a part herein wherein a satisfactory constructional example of the invention has been selected for illustrative purposes and wherein:

Fig. 2 is a vertical section through a warehouse, and

Fig. 3 is an enlarged detail of a section of the conveyor line.

Figure 1:
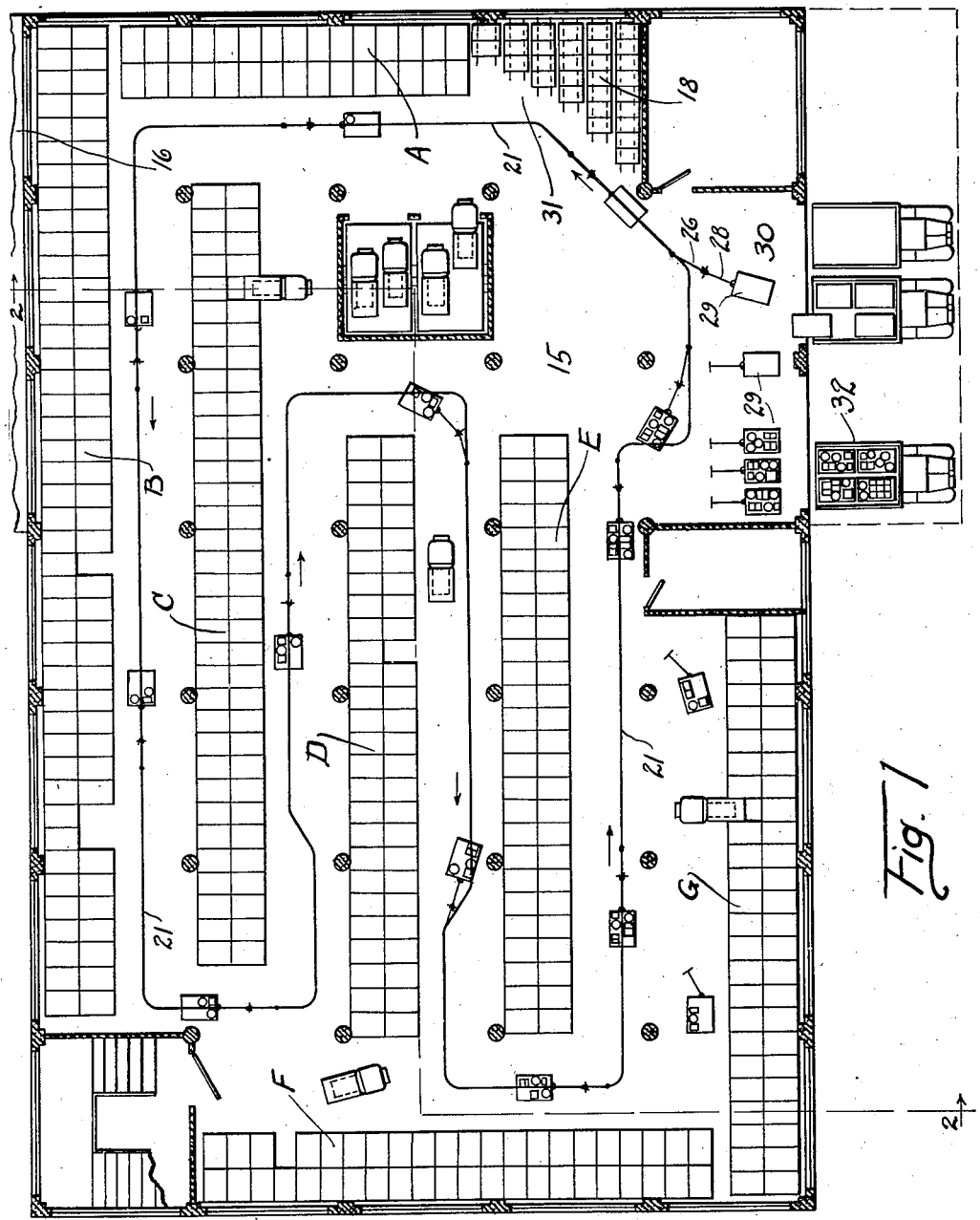
Fig. 1 is a plan view of a selector floor or area of a warehouse showing an example of a satisfactory grouping of mechandise with a conveyor truck line running about such floor adjacent to the stocks of merchandise placed thereon.

As shown in Fig. 2 of the drawings the warehouse building indicated generally by the reference character W includes a plurality of storage floors or areas 10, 11, 12 and 13, a receiving floor or area 14 and selector floor or area 15. The receiving floor or area 14 is preferably provided with a receiving platform 16 adjacent to a railroad siding 17 or other means for transporting goods in relatively large quantities to the warehouse.

Incoming shipments of goods are unloaded onto the platform 16 and receiving floor 14, preferably being placed upon skids of any suitable construction, and such as indicated by the reference character 18. After the goods have been unloaded and placed upon skids 18 they are transported preferably by means of small electric trucks 19 directly to the floor 13, or to the elevators 20 and carried thereby to a designated place on one of the storage floors 10, 11 or 12.

The selector floor or area 15 is arranged so that a large quantity of relatively small lots of goods of many different brands and kinds may be placed thereon in specially designed places adjacent to a conveyor line 21. The conveyor line 21, which may be of any suitable and well known construction, preferably is of the type wherein an endless chain 22 is supported from a track 23 and is driven by any suitable power means, not shown. The track 23 is supported from the ceiling 24 by means of a plurality of spaced brackets 25. In the particular constructional example selected for illustration the conveyor is of the type adapted to pull wheeled trucks about the selector floor or area. For this purpose the chain 22 has pivotally secured thereto at spaced intervals a plurality of depending draft devices such as bars or rods 26, each of which carries at its lower end, a hook, or hooks 27 adapted to be engaged with the handle 28 of a small hand truck 29; the latter preferably being of the well known lift type. The bars 26 are normally held, by means of a spring 28, in an upper position as indicated in Fig. 3 so as to provide sufficient head room under those bars 26 of the conveyor which at any time are not in use. As will be noted from Fig. 1 of the drawings the goods on the selector floor or area 15 are placed in a predetermined order in specially designated places to form ranks as indicated by the reference characters A, B, C, D, E, F and G. These ranks may be arranged in any suitable manner in accordance with the floor space available, but should be arranged so as to leave aisles or passageways between them. The conveyor 21 has its runs arranged over the aisles formed between the ranks and so that one run or section of the conveyor will pass along adjacent to the shipping platform 30.

A floor area indicated by the reference character 31 is reserved adjacent to the shipping platform 30 as a skid or truck storage place for the reception of empty skids 18.

The method of handling and storing the goods is as follows:

As hereinbefore pointed out shipments of goods received on the receiving floor or area 14 are immediately transported therefrom to the alloted space, for what may be termed the bulk storage of such goods, on one of the storage floors or areas 10, 11, 12 or 13. The handling of such goods from the receiving floor to the storage floors preferably being by means of electrically propelled lift trucks such as indicated by the reference character 19, it being understood that as the goods are unloaded on the receiving floor they are placed on skids 18 so that it will not be necessary to manually load the goods on the trucks 19. The lift portion of the electric truck 19 is lowered in the well known manner and the truck run under a loaded skid 18, the lift mechanism of the truck is actuated to raise the skid off the floor and the truck is run directly to the storage area 13 on the same floor, or to the elevator 20, and thence to the proper designated place on one of the floors 10, 11 or 12, as the case may be.

The goods on the selector floor, as hereinbefore pointed out, are arranged in ranks, each rank being formed by a plurality of single skids each preferably being loaded with a different brand or with one kind of merchandise. It will be noted that while each of the ranks consists of two rows of skids, that the outer row only of the ranks A, B, F and G, is accessible at all times, whereas in the ranks C, D, and E both rows of skids are accessible. This arrangement is, however, merely illustrative and is shown for the purpose of indicating the expedient that may be resorted to for the storing on the selector floor or area of goods of the type for which large orders are continually being received.

The preferred manner of handling the goods on the selector floor is as follows:

Let it be assumed that an order for a shipment of goods consisting of many diverse items is received by the warehouse. The order will be turned over to a shipping clerk who will secure a truck 29 and pull the same to a point adjacent the run of the conveyor at the skid storage area 31. When he has reached a point below the conveyor he will pull one of the bars 26 downwardly against the action of the spring 28 and engage the hooked end 27 of said bar with the handle 28 of the truck. An unloaded skid 18 may be placed by the operator upon the truck either before or after hitching the truck onto the conveyor. It will be understood that the conveyor 21 is actuated to travel at a comparatively slow speed, so that as the operator consults his order blank and as the truck is conveyed by the conveyor past the rank A, any goods contained in such rank that are to be included in the order to be filled are placed by the operator upon the truck as the latter passes the particular spot in which such goods may be stored. The operator goes along with the truck past the ranks B, C, D, E, F, and G selecting such goods as may be called for by the particular order and when the truck in its travel reaches the shipping platform 30 the truck is disengaged from the conveyor line and backed into position on the shipping platform ready to be wheeled onto a motor truck 32.

When the stock of goods on any particular skid in any of the ranks on the selector floor nears depletion, a fully loaded skid containing the goods of the particular kind or brand is brought from its designated place on one of the storage floors or areas, by means of an electric truck 19, the fully loaded skid being deposited in its proper place and the unloaded skid removed. The double rank tiers A, B, F and G are provided for goods of greater bulk or for goods of the type that are shipped in relatively larger quantities so that an ample stock of such goods may be maintained on hand at such times when there is a larger run for goods of any particular type as would make it difficult to keep the stock thereof replenished from the storage floors. The ranks C, D and E, as will be readily apparent, may be used for goods of smaller bulk or goods of the type that are ordered less frequently.

It will be seen from the foregoing that the invention permits of the grouping of smaller quantities of goods on the selector floor in such a manner as to provide an orderly arrangement of the goods in a minimum space. The arrangement of the aisles with a conveyor 9 transversing such aisles in juxtaposition of the stored goods insures that standard order sheets may be used having the various products tabulated thereon in the same order or sequence as the goods are arranged or grouped on the floor areas so that orders may be filled with a minimum amount of manual effort or lost motion. As the conveyor is driven to travel at a predetermined rate of speed, the time consumed by an employee in making up an order will, in most cases, be determined by the speed of travel of the conveyor. Moreover, as a complete stock of all the different kinds of goods is maintained on the selector floor no time is lost by an employee in waiting for elevators to transport an order truck to different floors of the warehouse. The use of a continually operating conveyor, with which the trucks may be detachably engaged, limits the power consumption for driving the conveyor to the shipping requirements at any particular time, that is to say, the conveyor will be called upon to transport only such goods as are actually being made up in orders for shipment. The draft devices 26 of the conveyor 21 are placed sufficiently close together that if an employee has a relatively large order to make up he may place two or three trucks closely adjacent to each other on the conveyor and travel around with said trucks as they are transported past the lines of merchandise on the selector floor.

It will be understood that while we have hereinbefore referred to the goods as being placed according to brands or kinds upon the skids, the invention is not limited to the use of only one skid in a bank or row, but that where there is a continual demand for relatively large amounts of one article, a number of skids of such article will be grouped together at the designated place; likewise if any particular articles are not in such great demand and are of small volume, a number of brands or kinds thereof may be placed on a single skid.

We claim:

The method of storing and shipping material which consists in storing goods in bulk according to a predetermined classification in specially designated storage floor areas, maintaining in a selector floor area removed from said storage areas, a complete stock consisting of a relatively small quantity of each item of a number of diverse items, the goods in the selector area being arranged in ranks with each item placed in a predetermined location according to a definite complete shipping order classification, arranging said ranks so as to form aisles or passageways from which the goods in said ranks will be readily accessible and so that a continuous passageway is provided upon such selector floor, providing a shipping space or area on said selector floor with which such passageway is in communication, maintaining a continuously operating load transporting mechanism and causing the same to traverse from said shipping space through said passageway past said complete stock, providing a plurality of load carrying members for detachable connection to said load transporting mechanism, transferring from said ranks such items as may be required to fill and assemble a complete order on a load carrying member by a single operator who accompanies such load carrying member in its travel, removing the load carrying member with its complete assembled order from said load transporting mechanism at said shipping space, maintaining a supply of merchandise in bulk on floor areas removed from said selector floor and in accordance with the same classification as maintained on said selector floor and replenishing as required the ranks of said selector floor with goods from said bulk storage areas.

HERBERT A. STEVENSON.
JERVIS B. WEBB.